United States Patent [19]
Wessels

[11] Patent Number: 5,564,727
[45] Date of Patent: Oct. 15, 1996

[54] LOCKING PINS USED WITH A LOCKING SYSTEM FOR A SEMITRAILER SLIDING UNDERCARRIAGE

[75] Inventor: Larry L. Wessels, Lakewood, Colo.

[73] Assignee: Rocky Mountain Technology Engineering Corp., Denver, Colo.

[21] Appl. No.: 407,970

[22] Filed: Mar. 22, 1995

Related U.S. Application Data

[63] Continuation-in-part of Ser. No. 996,580, Dec. 24, 1992, Pat. No. 5,314,201, and a continuation of Ser. No. 381,290, Jan. 31, 1995, Pat. No. 5,465,990.

[51] Int. Cl.$^6$ ............................................. B62D 53/06
[52] U.S. Cl. .................... 280/407.1; 280/149.2; 180/209
[58] Field of Search ............................ 280/405.1, 407.1, 280/149.2; 180/209

[56] References Cited

U.S. PATENT DOCUMENTS

| | | | |
|---|---|---|---|
| 3,778,079 | 12/1973 | Vornberger et al. | 280/149.2 |
| 4,353,565 | 10/1982 | Smith et al. | 280/149.2 |
| 4,838,566 | 6/1989 | Baxter et al. | 280/149.2 |

FOREIGN PATENT DOCUMENTS

| | | | |
|---|---|---|---|
| 0409923 | 2/1971 | Australia | 280/149.2 |

Primary Examiner—Paul N. Dickson
Attorney, Agent, or Firm—Edwin H. Crabtree; Donald W. Margolis; Ramon L. Pizarro

[57] ABSTRACT

Improved locking pins and parallel rails used with a locking pin system mounted on a sliding undercarriage of a semitrailer. The locking pin system used for securing and releasing a sliding undercarriage from a pair of the parallel rails mounted on an underside of the semitrailer. The parallel rails have spaced apart locking pin holes. The rails are designed to withstand dynamic loads placed thereon when the pins are extended against the rails prior to being received in the next available pin holes. The new locking pins are integrally formed in a one piece construction and are substantial cylindrical in shape. Each pin is characterized by having a flat circular insertion end with a pin hole entry collar. The pin hole entry collar is circular having a diameter in a range of one half to three quarters of the diameter of the locking pin hole. From the pin hole entry collar and extending rearwardly is an outwardly tapered center portion connected to a pin hole seating collar. The pin hole seating collar is circular having a diameter of slightly less than the diameter of the locking pin hole for tight seating in the pin hole. The pin hole seating collar is disposed next to a spring retaining ring. From the spring retaining ring extends a pin shank. By design, the new locking pins provide for greater time in order to advance into newly selected locking pin holes when changing the position of the sliding undercarriage on the semitrailer.

15 Claims, 2 Drawing Sheets

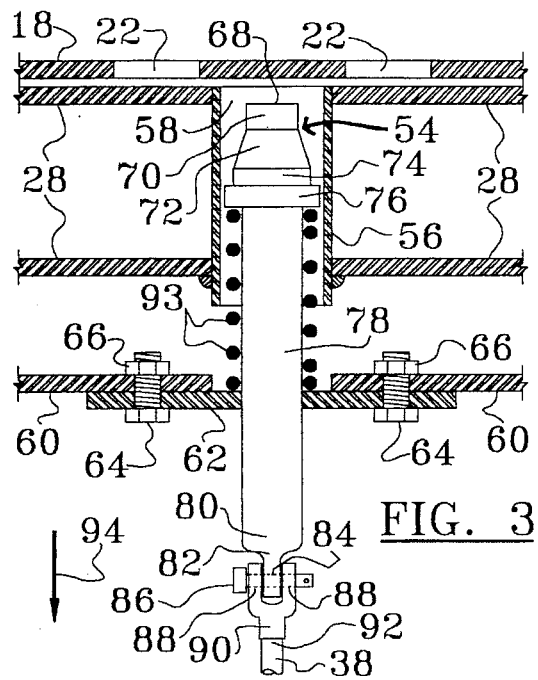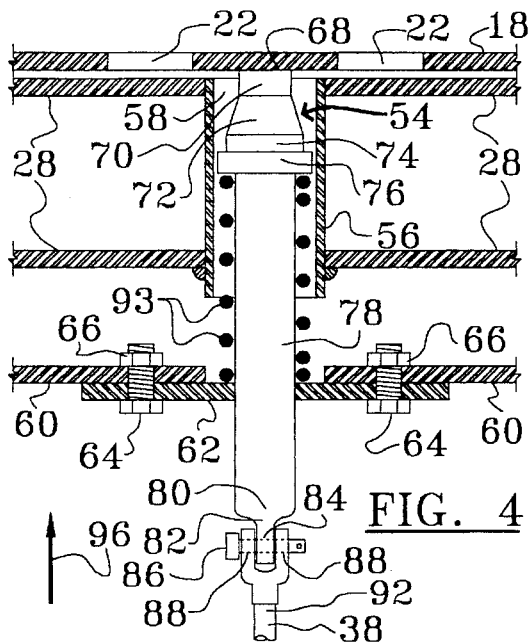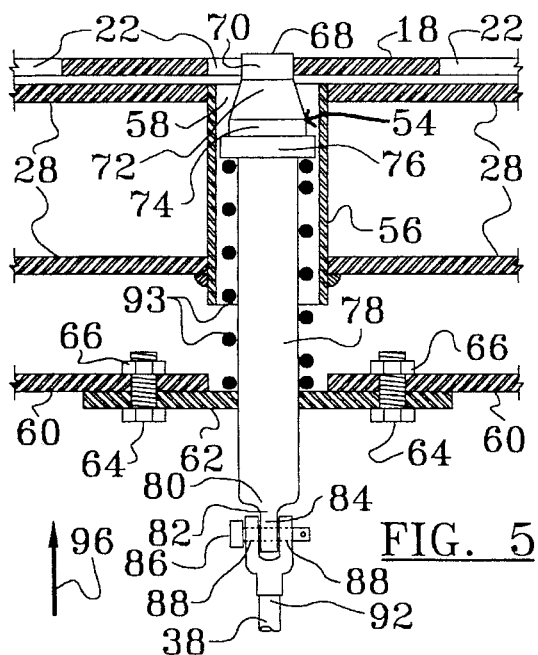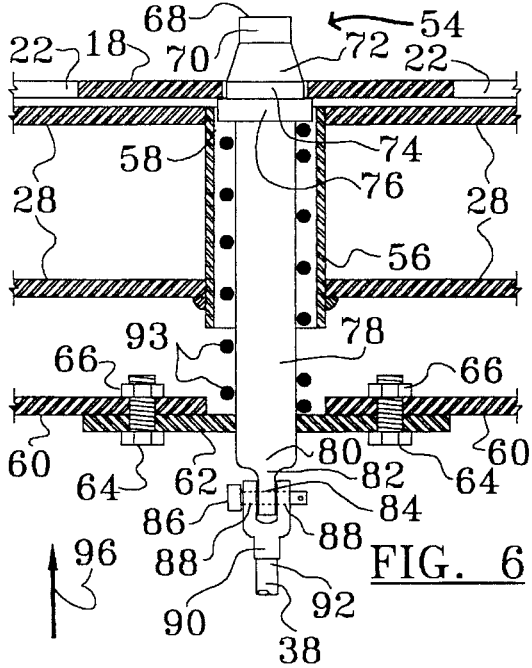

LOCKING PINS USED WITH A LOCKING SYSTEM FOR A SEMITRAILER SLIDING UNDERCARRIAGE

BACKGROUND OF THE INVENTION

This application is a continuation-in-part application of patent application Ser. No. 07/996,580, filed on Dec. 24, 1992, now U.S. Pat. No. 5,314,201, and a continuation of patent application Ser. No. 08/381,290 filed on Jan. 31, 1995, now U.S. Pat. No. 5,465,990, by the subject inventor. The two application having a title of "LOCKING SYSTEM FOR A SEMITRAILER SLIDING UNDERCARRIAGE".

(a) Field of the Invention

This invention relates to an improved design of locking pins used in a locking pin system and more particularly, but not by way of limitation, to improved locking pins with a new profile for replacing current locking pins used with a sliding undercarriage for securing the undercarriage to a pair of parallel rails on the underside of a semitrailer.

(b) Discussion of Prior Art

A common truck transportation system in the United States is a tractor pulling a semitrailer. The tractor has an engine, transmission, steerable front axle with wheels and one or more rear drive axles and wheels. The tractor is attached to a semitrailer through a fifth wheel which is located over the tractor's rear drive axle. The semitrailer rides on a running gear or called herein a "sliding undercarriage". The sliding undercarriage includes a suspension, one or more unpowered axles, wheels, a pneumatic brake system and a locking pin release system. The sliding undercarriage is slidable along a portion of the length of the underside of the semitrailer.

Today, federal and state laws define weight limits per axle for tractors and semitrailers. Fines are imposed at each state port-of-entry if load limits are exceeded. By shifting the sliding undercarriage under the semitrailer, the driver can improve the balance of load between the tractor and the semitrailer to meet highway axle weight limit requirements. Also, to Improve maneuverability on city streets, the sliding undercarriage can be shifted toward the tractor to shorten the unit's turning radius.

The sliding undercarriage is typically locked between two parallel rails that are integral to the structure of the bottom frame of the semitrailer. Lateral movement relative to the semitrailer is limited to the clearance between the two rails and the sliding undercarriage frame. The sliding undercarriage can be moved longitudinally, generally five to seven feet, under the semitrailer by sliding along and between the two rails. The sliding undercarriage is locked to the semitrailer rails by a system of usually two or four steel pins that are part of the sliding undercarriage frame. The pins are aligned in opposing pairs in the sliding undercarriage and in a locked position project outward through locking pin holes in the rails. Currently the locking pin diameter is slightly less than the diameter of the locking pin holes. The locking pin holes are generally space three to six inches apart along the rails. The locking pins are usually spring loaded to retain them in a locked position during travel. The locking pins are retracted and reinserted in the locking pin holes using a manually operated locking pin release system.

Semitrailers are commonly equipped with pneumatic spring brake systems which typically operate at 90–120 psi. The spring loaded air brakes are automatically set by the springs when air pressure is removed through a control in the tractor which vents the supply air line and spring brake air lines to the atmosphere. To release the air brakes, air pressure from the tractor compressor is routed through the supply air line and a relay valve to apply pressure from the air supply tank to overcome the brake spring bias force.

The most common way to reposition the sliding undercarriage under the semitrailer is through a process of trial and error. The driver locks the brakes on both the tractor and semitrailer. The driver then climbs out of the tractor, walks to the sliding undercarriage, and pulls or lifts the manually operated locking pin release lever which is usually positioned immediately ahead of or between the left wheels of the sliding undercarriage. Most Original Equipment Manufacturer (OEM) manually operated locking pin release systems are a mechanical apparatus designed to rotate when the locking pin release lever is pulled or lifted. The pins are retracted by a pulling or a lifting force transmitted through a series of linkages designed to provide a mechanical advantage to overcome the spring loaded locking pin retention force. The pin release apparatus usually includes provisions to hold the lever and locking pins in the retracted position while the driver returns to the tractor. The driver then releases the brakes on the tractor while leaving the brakes applied on the semitrailer's sliding undercarriage. The tractor is then driven forward or backward to slide the semitrailer relative to the sliding undercarriage The driver, after sliding the semitrailer the distance considered correct, then reapplies the tractor brakes. The driver again leaves the tractor, walks back to the sliding undercarriage, and releases or pushes down the pin release lever. The spring loaded locking pins are usually not perfectly aligned to reinsert through locking holes. Each locking pin, when not fully reinserted, is pressed by the locking pin retaining spring against the rail at a location between two locking pin holes. The driver returns to the tractor, releases the tractor brakes, and moves the semitrailer only a few inches or less as required for the spring loaded pins to drop into the first holes in the rails that move into alignment. The driver must then reapply the brakes and walk around the semitrailer to visually verify that all pins are in locked positions. The driver then secures the locking pin release lever to the sliding undercarriage for highway travel.

The process of retracting the locking pins and sliding the bottom side of the semitrailer over the sliding undercarriage is more easily completed with the assistance of a second person. The second person pulls or lifts the locking pin release lever and assists the driver in repositioning the sliding undercarriage under the semitrailer. The manually operated pin retraction systems can become impossible to operate due to damage or corrosion of the linkage and contamination with dirt and ice from exposure under the semitrailer. Locking pins can also become stuck in the holes in the rails if the semitrailer is parked on an incline or positioned with a slight twist in the frame. Pins are often loosened only by pounding them out with hammers. The usual procedure to loosen stuck locking pins is to apply the brakes on the sliding undercarriage and rock the semitrailer by repeatedly driving the tractor forward and backward a few inches. The assistant provides a constant pull on the pin release lever to apply the maximum force possible to overcome the locking pin springs and withdraw the pins if they become loose. Similar problems are often encountered in trying to reinsert locking pins. Extra force and assistance to align individual pins may be required to reinsert locking pins into new locking holes after the sliding undercarriage has been repositioned. The locking pin linkage can be damaged, bent, or twisted during attempts to loosen stuck pins. Distorted linkage may limit the distance that locking pins can be reinserted and make it impossible to reinsert pins into locked positions. The assistant positioned under the semitrailer near the wheels during attempts to loosen stuck locking pins or reinsert pins can be seriously injured. Bad weather such as rain, ice, and snow increase the probability of injury to an assistant positioned near the sliding undercarriage wheels. Fatalities related to attempts to retract and reinsert the locking pins have been reported.

The problems inherent in retracting and inserting locking pins with the above mentioned manually operated pin retraction apparatus have been recognized in U.S. Pat. No. 4,944,522 to Hart, U.S. Pat. No. 4,838,578 to Baxter, U.S. Pat. No. 4,353,565 to Smith et al., U.S. Pat. No. 4,286,797 to Mekosh et al., U.S. Pat. No. 3,775,079 to Vornberger, U.S. Pat. No. 3,618,969 to Glassmeye, U.S. Pat. No. 5,199,732 to Lands et al., and U.S. Pat. No. 5,137,296 to Forman.

The above mentioned patents to Hart and Baxter provide means to modify the manually operated pin retraction apparatus. The modified systems as described do not provide sufficient force to retract stuck locking pins, especially when complicated by corrosion, damage or contamination. Also, the flexibility of the modified linkage described in these patents is an inefficient means to reinsert locking pins into the locking pin holes. Also, bent linkage may actually prevent the locking pins from being fully inserted into locked positions even when the control lever position indicates that all pins are locked.

In the patents to Smith et al. and to Mekosh et al. complex electromechanical and pneumatic systems are disclosed that require extensive structural modifications to the semitrailer and possibly to the tractor. The patents to Lands et al. and Forman provide air operated cylinders and locking pins which are pneumatically released by the cylinders. But the systems described in these two patents do not provide a fail-safe all pneumatic system which prevents the locking pins from being retracted unless the semitrailer brakes are set and will automatically reset the pins if air pressure is applied to release the semitrailer brakes.

None of the above mentioned manual pin pulling systems, retrofit pin pulling system, and pneumatic pin pulling systems address the issue of improved locking pins and parallel rails as described herein for ease in quickly inserting pins in locking pin holes in the rails, ease in pulling the pins from the locking pin holes and reducing movement of locking pins in locking pin holes thereby reducing wear and possible shear of the pins during the operation of the semitrailer.

SUMMARY OF THE INVENTION

In view of the foregoing, it is a primary object of the invention to provide new and improved locking pins and parallel rails for replacing current locking pins and rails used with a semitrailer locking pin systems.

Another object of the present invention is to provide a locking pin with a new profile that will greatly enhance the safety of all existing and new semitrailers having a locking pin system thereon used with a sliding axle.

Still another object of the new pin design is to allow greater time to advance the pins into newly selected locking pin holes when changing the position of the sliding undercarriage on the semitrailer. Also, the pins can be easily removed from the locking pin holes.

A further object of the invention is to provide locking pins that will automatically self-alignment when received in the locking pin holes. Also the new pins provide a tight seat in the selected locking pin holes thereby reducing movement and wear between the sliding undercarriage and the parallel rails on the semitrailer.

Another object of the invention is the use of parallel rails designed to withstand dynamic loads of 10,000 lbs or greater placed thereon when the pins are pneumatically extended against the rail and prior to the pins being received in the next available locking pin hole.

The new locking pins are integrally formed in a one piece construction and are substantial cylindrical in shape. Each pin is characterized by having a flat circular insertion end with a pin hole entry collar. The pin hole entry collar is circular having a diameter in a range of one half to three quarters of the diameter of the locking pin hole. From the pin hole entry collar and extending rearwardly is an outwardly tapered center portion connected to a pin hole seating collar. The pin hole seating collar is circular having a diameter of slightly less than the diameter of the locking pin hole for tight seating in the pin hole. The pin hole seating collar is disposed next to a spring retaining ring. From the spring retaining ring extends a pin shank. An end of the pin shank is adapted for attachment to a piston.

These and other objects of the present invention will become apparent to those skilled in the art from the following detailed description, showing the contemplated novel construction, combination, and elements as herein described, and more particularly defined by the appended claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 3 illustrates one embodiment of the new locking pin attached to a piston and held in a retracted position free from a selected locking pin hole in one of the parallel rails.

FIG. 4 illustrates the new locking pin attached to a piston and extended toward a selected locking pin hole in one of the parallel rails. A flat extension end of locking pin is engaged against a portion of the rail between two locking pin holes.

FIG. 5 illustrates the extension of a portion of the locking pin into the next available locking pin hole when the parallel rails are moved with respect to the sliding undercarriage.

FIG. 6 illustrates the complete seating of the new locking pin with the pin hole seating portion of the locking pin tightly received in the locking pin hole.

DESCRIPTION OF THE PREFERRED EMBODIMENTS

Figure 1:
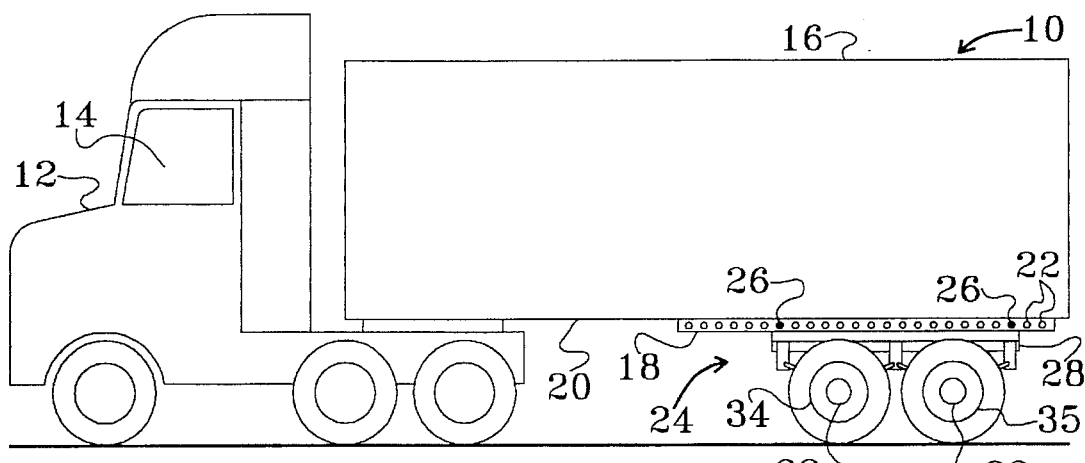
FIG. 1 is a side view of a typical highway tractor and semitrailer with a longitudinally sliding undercarriage mounted on the underside of the rear of the semitrailer.

In FIG. 1 a side view of a typical highway truck is shown having a general reference numeral 10. The truck 10 includes a tractor 12 with cab 14 with the tractor 12 pulling a semitrailer 16. The semitrailer 16 has a pair of parallel rails 18 mounted on an underside 20 of the semitrailer 16. The rails 18 include a plurality of locking pin holes 22 along the length thereof. The holes 22 are generally spaced 3 to 6 inches apart. The holes have a diameter typically of 1¼ inches or 1⅝ inches. A sliding undercarriage, having a general reference numeral 24, is locked to the rails 18 using two or more locking pins 26. The sliding undercarriage 24 includes an axle frame 28 with a pair of axles 32 with tandem front wheels 34 and tandem rear wheels 35 mounted on the axles 32.

Figure 2:
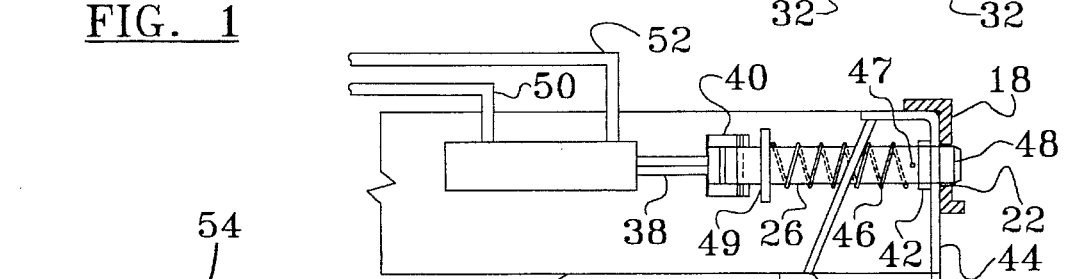
FIG. 2 is a front view of a prior art locking pin attached to one end of a piston in an air cylinder. The prior art locking pin is received in a locking pin hole in one of the semitrailer's parallel rails.

In FIG. 2 a front view of a portion of the axle frame 28 and a frame cross members 29 is shown. Also, one of the parallel rails 18 is shown in cross section with locking pin hole 22. In this view, an air cylinder 36 is secured to the side of the cross member 29. The air cylinder 36 includes a piston 38 which is pivotally attached to the locking pin 26 using a swivel connector 40. The locking pin 26 is a standard locking pin used in the trucking industry in conjunction with different types of locking pin system and represents a current prior art configuration.

The locking pin 26 is slidably attached to the axle frame 28 by a bushing 42 mounted on an angular shaped upper portion 44 of the frame 28. The locking pin 26 includes a coil spring 46 received around a portion of the length of the pin 26 and held in compression between a spring pin 47 mounted on the locking pin 26 and a retaining collar 49 attached to an upper portion of the frame 28. The coil spring 46 acts to bias the locking pin 26 toward engagement of a chamfered end 48 of the pin 26 through one of the locking pin holes 22 as shown in this drawing. The chamfered end 48 is designed to help the locking pin 26 in its insertion into the locking pin hole 22.

The air cylinder 36 is shown in this drawing pressurized to force the locking pin 26 into an extended and locked position in one of the pin holes 22 of the rail 18 using high pressure air line 50. When the air pressure to the cylinder 36 is reversed using high pressure air line 52, the pin 26 is moved from right to left and in an unlocked or disengaged position from the rail 18. The sliding undercarriage 24 is now free to be adjusted along the length of the rails 18.

All locking pins such as pin 26 now in use on locking pin systems have approximately the same shape and profile though they may differ in length and diameter from manufacturer to manufacturer. Current pins 26 have a diameter of ⅛ to ¼ inches less than the locking pin hole diameter. For example, a manufacture may have locking pin hole diameters of 1⅝ inches and a locking pin diameter of 1⅜ inches. Because of the close diameter sizing between the locking pins 26 and the locking pin holes 22, an ongoing problem with this type configuration exists when the locking pins 26 are extended and engage a portion of the rail 18 between locking pin holes 22 when adjusting the position of the sliding undercarriage 24. Should the sliding undercarriage 24 fail to slide at slow speeds during movement of the semitrailer 16 due to friction between the semitrailer 16 and the undercarriage 24, the semitrailer 16 may proceed to highway travel speeds with the locking pins not engaged. Application of the brakes would cause the undercarriage 24 to move backward relative to the semitrailer 16. The locking pins 26 would attempt to insert into the locking pin holes 22 as alignment occurred. The problem with the current pin design as shown in FIG. 2 occurs at this point. With the locking pin 26 and locking pin hole 22 diameters being approximately the same size, the time period in which the locking pins 26 on the sliding undercarriage 24 and the locking pin holes 22 in the rails 18 align is extremely short. As the pin 26 is allowed to advance once alignment is achieved, the chamfered end 48 or beveled face of the pin 26 will strike the oncoming edge of the locking pin hole 22 and be rejected. The inertia of the pin 26 will not allow it to accelerate fast enough to penetrate the locking pin hole 22 before the chamfered end 48 or beveled edge of the pin 26 contacts an edge of the locking pin hole 22. The result is that the pins 26 fail to insert in the first available locking pin hole 22 and, as the braking action continues, the siding undercarriage 24 continues to accelerate relative to the semitrailer 26. The pins 26 continue to attempt to insert in each successive locking pin hole 22 but are rejected. Thus is a dangerous situation as, even with a safety bar in place, the sliding undercarriage 24 could separate from the semitrailer 16 during operation over the road. This problem is compounded greatly by some current pin insertion systems that link all of the pins together with a mechanical linkage which requires alignment of all of the pins at the same instant before any of the pins can attempt to insert.

The following drawings describe the design and configuration of a new locking pin design that will eliminate the problem described above along with parallel rails designed to withstand dynamic loads placed thereon when the pins are extended against the rails prior to entering a selected locking pin hole. The solution to the problem is to provide a greater length of time for the locking pins to advance into the slider rail holes. This is achieved by using a tapered pin made of high strength steel wherein the end of the pin has an initial diameter substantially less than the diameter of the locking pin hole 22.

In FIGS. 3–6 and 9, one embodiment of a new locking pin, having general reference numeral 54, is shown. In FIG. 3, a top view of the locking pin 54 is shown with a portion of the axle frame 28 and a portion of one of the parallel rails 18 with locking pin holes 22 shown in cross section. A portion of the locking pin 54 is received in a hollow sleeve or pipe 56 welded at right angles to the axle frame 28. An opening 58 in the pipe 56, for receiving one end of the locking pin 54 therethrough, is disposed next to the side of the rail 18 and locking pin holes 22. Also, a retaining plate 60 is attached to the axle frame 28 with a spring stop plate 62 secured thereto by threaded bolts 64 and nuts 66.

Figure 9:
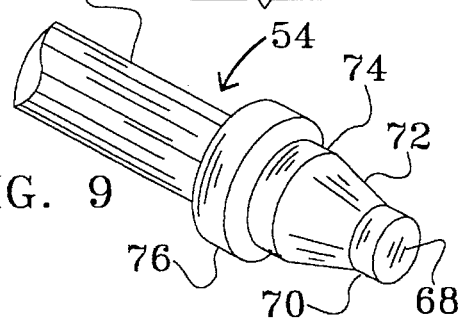
FIG. 9 illustrates a perspective view of the locking pin shown in FIGS. 3–6.

Referring now to both FIGS. 3 and 9, the locking pin 54 is integrally formed in a hardened steel one piece construction and is substantially cylindrical in shape. The pin 54 includes a flat circular insertion end 68 with a pin hole entry collar 70. The pin hole entry collar 70 is circular having a diameter in a range of one half to three quarters of the diameter of the locking pin hole 22. For example, the diameter of the collar 70 is 0.875 inches and the diameter of the locking pin hole 22 is 1.3125 inches.

From the pin hole entry collar 70 extending rearwardly, is an outwardly tapered center portion 72 which merges into a pin hole seating collar 74. The pin hole seating collar 74 is circular having a diameter of 1,250 inches which is slightly less than the diameter 1.3125 inches of the locking pin hole 22. These dimensions of the collar 74 and pin hole 22 provide for tight seating in the pin hole 22 to eliminate movement and wear between the pins 54 and the parallel rails 18. The pin hole seating collar 74 is disposed next to a spring retaining ring 76. The outer diameter of the ring 76 is 1.500 inches. From the spring retaining ring 76 extends an elongated pin shank 78. The shank 78 has a diameter of 1.000 inches. An end 80 of the pin shank 78 includes a collet 82 with a hole 84 therein for receiving a cotter pin 86. The pin 86 is received through holes 88 in a clevis 90 attached to an end 92 of piston 38. A coil spring 93 is disposed around a portion of the shank 78 and held in place with one end bearing against the spring retaining ring 76 and an opposite end bearing against the spring stop plate 62. The coil spring 93 helps in retaining the locking pin. 54 in a locked position in a selected locking pin hole 22 as shown in FIG. 6. In FIG. 3, the locking pin 54 is held in a retracted position by the piston 38 as indicated by arrow 94.

In FIG. 4, the air cylinder 36 has extended the piston 38 as indicated by arrow 96, and the locking pin 54 has moved forward. Ideally, a selected locking pin hole 22 would be properly indexed in front of the opening 58 for receiving the pin 54 therein. But this is not always the case, since proper indexing of the pins 54 and holes 22 is not necessarily accomplished by visual alignment and in a two and four pin locking system the parallel rails may be skewed and some pins may be correctly inserted into selected locking pin holes while other pins engage the side of the rail 18. It is important to note that part of the subject invention is the use of parallel rails 18 made of high strength steel and able to withstand dynamic loads placed thereon by the pins 54 as shown in FIG. 4 and when the pins 54 engage the side of the rails 18 prior to entry into the next selected locking pin holes 22. The strength of the rails 18 must handle impact loads from the pins 54 of 10,000 lbs. and greater to prevent the bending of the rails 18 and possibly deforming or enlarging the locking pin holes 22. For example, the rails 18 may have a minimum of ASTM A572, Grade 50, while the pins 54 have a minimum of SAE 4023 high strength steel and a minimum strength of 105 ksi.

From the initial retracted position shown in FIG. 3, the locking pin 54 is advanced under approximately 400 pounds of force by the independent air cylinder 36. With an initial pin diameter being substantially smaller than the locking pin hole 22, the pin 54 is allowed to accelerate and advance into the next available locking pin hole 22 as shown in FIG. 5. Obviously, this important feature allows all of the locking pins 54, in either a two pin or four pin locking system, to engage the first available locking pin holes 22 and stop the sliding undercarriage 24 movement relative to the semi-trailer 16 with the undercarriage 24 held firmly in place relative to the underside 20 of the semitrailer 16.

In FIG. 6, the new locking pin 54 with the 400 pounds of force thereon has moved forward into a fully inserted seated position in the locking pin hole 22 aided by the tapered center portion 72. In the seated position, the pin hole seating collar 74 is received inside the locking pin hole 22 in a snug fit. As mentioned above, the difference in diameter between the locking pin hole 22 and the seating collar 74 is in a range of 0.050 inches. This feature is important, since the close fit of the locking pin 54 and locking pin hole 22 reduces movement and wear between the sliding undercarriage 24 and the parallel rails 18. Also, the possibility of shearing of the pin 54 is eliminated and longitudinal and lateral movement of the undercarriage 24 in relationship to the underside 20 of the semitrailer 16 is greatly reduced.

Figures 7, 8:
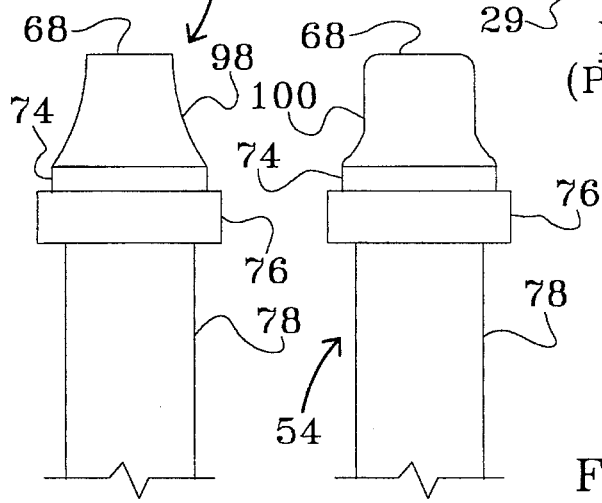
FIGS. 7 and 8 illustrate two alternate embodiments of the profile of the new locking pin.

In FIG. 7, another embodiment of the new locking pin 54 is shown with the flat circular insertion end 68 but without the pin hole entry collar 70. In this example, from the insertion end 68 an outwardly tapered center portion 98 extends rearwardly merging into the pin hole seating collar 74. In FIG. 8, still another embodiment of the new locking pin 54 is shown with the flat circular insertion end 68 but without the pin hole entry collar 70. In this second example, from the insertion end 68 an outwardly tapered bell shaped center portion 100 extends rearwardly merging into the pin hole seating collar 74. The dimension of the embodiments shown in FIGS. 7 and 8 are similar to the dimension of the locking pin 54 described in FIGS. 3–6 and 9. Also, depending on the manufacture, the sizes of the diameters of the locking pin holes 18, the spacing between holes 18, and the various diameters of the pin 54 may vary and still be within the spirit and scope of the invention as described above.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A locking system mounted on a sliding undercarriage of a semitrailer, the semitrailer pulled by a tractor, the locking system used for securing and releasing the sliding undercarriage from a pair of parallel rails mounted on an underside of the semitrailer, the parallel rails having spaced apart locking pin holes along the length thereof, the locking system comprising:

a pair of air cylinders with pistons, said air cylinders mounted on the sliding undercarriage and disposed next to the parallel rails;

locking pins attached to said pistons, a portion of said locking pins inserted into selected locking pin holes in the parallel rails, said locking pins having an insertion end for receipt in the locking pin holes;

a pin hole entry collar, one end of said pin hole entry collar disposed next to said insertion end of said locking pins, said pin hole entry collar having a diameter in a range of one half to three quarters of the diameter of the locking pin holes; and said locking pins from an opposite end of said pin hole entry collar taper outwardly merging into a pin hole seating collar, said pin hole seating collar having a diameter slightly less than the diameter of the locking pin holes.

2. The locking system as described in claim 1 wherein said locking pins include a spring retaining ring disposed next to said pin hole seating collar and an elongated shank, one end of the shank adapted for attachment to said piston.

3. The locking system as described in claim 2 further including a coil spring disposed around a portion of the shank for biasing said locking pins in an extended position in the locking pin holes.

4. Locking pins and rails for a locking pin system mounted on a sliding undercarriage of a semitrailer, the semitrailer pulled by a tractor, the locking system used for securing and releasing the sliding undercarriage slidably mounted on an underside of the semitrailer, the locking pins and rails comprising:

a pair of high strength metal parallel rails, said rails mountable on the underside of the semitrailer and having spaced apart locking pin holes along the length thereof;

locking pins, a portion of said locking pins inserted into said locking pins holes in said parallel rails, said locking pins having an insertion end for receipt in said locking pin holes; and a pin hole entry collar, one end of said pin hole entry collar disposed next to said insertion end of said locking pins, said pin hole entry collar having a constant diameter in a range of one half to three quarters of the diameter of said locking pin holes for ease in inserting the pins therein.

5. The pins and rails as described in claim 4 wherein said locking pins from an opposite end of said pin hole entry collar taper outwardly merging into a pin hole seating collar, said pin hole seating collar having a diameter slightly less than the diameter of said locking pin holes.

6. The pins and rails as described in claim 4 wherein said locking pins include a spring retaining ring disposed next to said pin hole seating collar and an elongated shank.

7. The pins and rails as described in claim 6 further including a coil spring disposed around a portion of said shank for biasing said locking pins in an extended position in said locking pin holes.

8. The pins and rails as described in claim 6 wherein one end of said shank is formed into a collet for pin attachment to locking pin insertion and retraction means for inserting and retracting said pins in selected locking pin holes in said parallel rails.

9. The pins and rails as described in claim 8 wherein said locking pin insertion and retraction means is a pair of air cylinders with pistons, each of said air cylinders mounted on the sliding undercarriage, each of said pistons attached to the collet in the elongated shank of said locking pins.

10. The pins and rails as described in claim 9 wherein said air cylinders and pistons apply through said locking pins a force in a range of 400 lbs. and greater when inserting and retracting said locking pins from said locking pin holes.

11. The pins and rails as described in claim 4 wherein said locking pin holes on said parallel rails are disposed along the length of said rails and centered 3 to 6 inches apart.

12. A locking system mounted on a sliding undercarriage of a semitrailer, the semitrailer pulled by a tractor, the locking system used for securing and releasing the sliding undercarriage from at least one parallel rail mounted on an underside of the semitrailer, the parallel rail having spaced apart locking pin holes along the length thereof, the locking system comprising:

a first air cylinder with piston, said firs air cylinder mounted on the sliding undercarriage and disposed to a first parallel rail;

a first locking pin attached to said piston, a portion of said first locking pin inserted into selected locking pin holes in the first parallel rail, said first locking pin having an insertion end for receipt in the locking pin holes;

a pin hole entry collar, one end of said pin hole entry collar disposed next to said insertion end of said first locking pin, said pin hole entry collar having a diameter in a range of one half to three quarters of the diameter of the locking pin holes; and said first locking pin from an opposite end of said pin hole entry collar tapers outwardly merging into a pin hole seating collar, said pin hole seating collar having a diameter slightly less than the diameter of the locking pin holes.

13. The locking system as described in claim 12 further including a second air cylinder with piston, said second air cylinder mounted on the sliding undercarriage and disposed next to a second parallel rail;

a second locking pin attached to said piston, a portion of said second locking pin inserted into selected locking pin holes in the second parallel rail, said second locking pin having an insertion end for receipt in the locking pin holes;

a pin hole entry collar, one end of said pin hole entry collar disposed next to said insertion end of said second locking pin, said pin hole entry collar having a diameter in a range of one half to three quarters of the diameter of the locking pin holes; and said second locking pin from an opposite end of said pin hole entry collar taper outwardly merging into a pin hole seating collar, said pin hole seating collar having a diameter slightly less than the diameter of the locking pin holes.

14. The locking system as described in claim 13 wherein said first and second locking pins include a spring retaining ring disposed next to said pin hole seating collar and an elongated shank, one end of the shank adapted for attachment to said piston.

15. The locking system as described in claim 14 further including a coil spring disposed around a portion of the shank for biasing said first and second locking pins in an extended position in the locking pin holes.

* * * * *